July 14, 1942.  A. E. JENSEN  2,289,652

SHAVING MACHINE

Filed June 14, 1938  2 Sheets-Sheet 1

INVENTOR.
ARTHUR E. JENSEN
BY Harold W. Mattingly
ATTORNEY.

July 14, 1942.  A. E. JENSEN  2,289,652
SHAVING MACHINE
Filed June 14, 1938  2 Sheets-Sheet 2
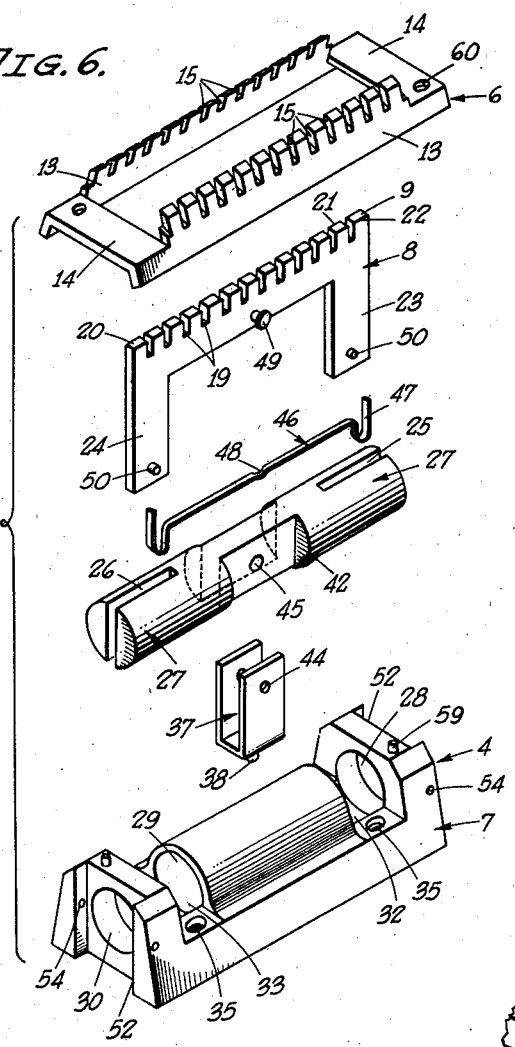
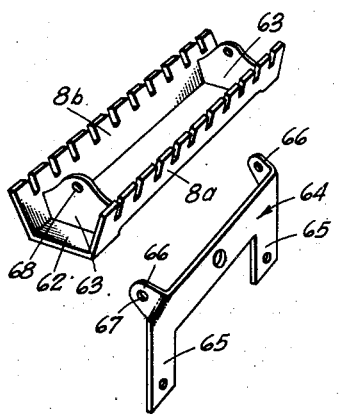
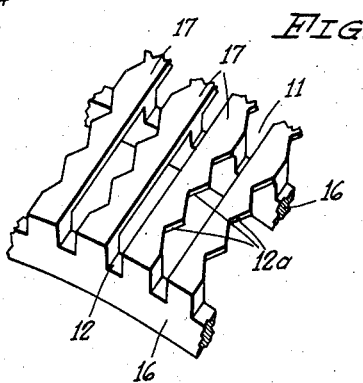
ARTHUR E. JENSEN
INVENTOR.
BY
ATTORNEY.

Patented July 14, 1942

2,289,652

UNITED STATES PATENT OFFICE 2,289,652

SHAVING MACHINE

Arthur E. Jensen, Anaheim, Calif.

Application June 14, 1938, Serial No. 213,640

17 Claims. (Cl. 30—43)

My invention relates to shaving machines and has particular reference to a machine adapted to clip or shear hair close to the skin, adapting the same to be used for shaving purposes.

Power driven razors or clipping machines adapted for shaving purposes depend for their operation upon a pair of shearing members, one of which is moved across the skin surface to be shaved while the other is reciprocated or oscillated relative to the first member so as to shear or clip the hair. In constructions heretofore proposed for this purpose considerable difficulty has been encountered in constructing the outer or skin-contacting blade member of sufficient thinness to permit the shearing contacts to be made close to the skin surface and thus clip the hair close enough to the skin surface to produce a smooth skin shave.

In attempting to approach this result of close shaving, both the stationary or skin-contacting blade member and the movable blade member must be machined with extreme accuracy and must be mounted relative to each other with extreme accuracy to insure that the movable blade will move through a definitely fixed path so close to the skin surface as will permit close clipping of the hairs but yet not sufficiently close to cut or "burn" the skin. The necessity for such accurate or precision construction has rendered the cost of manufacture of such razors or clipping machines relatively great, since the entire stationary blade member and its frame must be made of high grade steel to provide the necessary sharp shearing edges and also to resist wear between itself and the movable blade. Likewise the entire movable blade member has heretofore been constructed of high grade steel machined with watch-like precision.

It is an object of my invention to provide a razor construction in which the greater portion of the members employed for both stationary and movable blade and their mountings may be simply and inexpensively made from stampings and in which the machining and accurate finishing of the parts is maintained at a minimum.

Another object of my invention is to provide a razor construction of the character set forth in which the stationary blade member may be constructed from a stamping of relatively thin sheet material, stamped generally to a desired shape and then with a minimum of machining the cutting or shearing edges may be formed thereon.

Another object of my invention is to provide a construction as set forth in the preceding paragraph wherein the stationary shearing member may be constructed separately from the frame upon which it is supported to permit the stamping of the frame portion from relatively inexpensive material and to permit the formation of the shearing member of high grade steel readily cut or machined to provide the desired shearing edges.

Another object of my invention is to provide a construction as set forth in the preceding paragraphs wherein the stationary or face-contacting shearing member may be provided with extremely thin shearing blade structures and in which a plurality of reinforcing or stiffening ribs or webs are provided to hold the blades rigid with respect to each other and with respect to a cooperating movable blade.

Another object of my invention is to provide a razor construction in which the movable blade may comprise a stamping from a relatively thin sheet or plate of suitable material having slots formed in one edge thereof to receive the reinforcing members to the stationary blade and in which the only machining or finishing operations which are required is the mere grinding of one edge of the plate-like blade to a plane surface.

Another object of my invention is to provide a construction as set forth in the preceding paragraph wherein the mounting for the movable blade may be constructed to include a base member having a simple bore extending longitudinally therethrough to receive a simple cylindrical pin comprising a holder or support for the movable blade plate, thus minimizing the machining operations required for the provision of bearings or bearing surfaces for the movable blade member.

Another object of my invention is to provide a simple assembly of movable blade, pivot therefor and bearing or base support therefor which will permit the movable blade member to be substantially self-adjusting with respect to a stationary blade cooperating therewith.

Other objects and advantages of my invention will be apparent from a study of the following specifications, read in connection with the accompanying drawings, wherein Fig. 1 is a perspective view of a shaving machine constructed in accordance with my invention assembled upon a handle in which is contained a suitable motor for operating the machine;

Fig. 6 is an exploded perspective view of the stationary blade frame, the movable blade plate, its pivot shaft, the coupling employed to connect the shaft to an operating motor, and the base block comprising the bearing for the shaft;

Fig. 7 is an exploded perspective view of a modified form of movable blade and support therefor which may be substituted for the plate blade shown in Figs. 3 through 6; and Fig. 8 is a detail enlarged perspective view of a portion of the stationary blade member and illustrating a modified form of shearing edge which may be provided upon the stationary blades.

Figure 1:
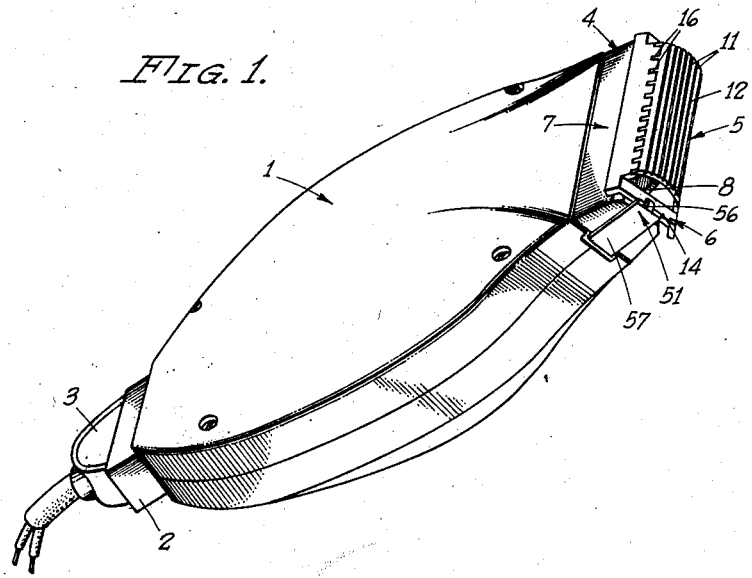

Referring to the drawings, I have illustrated in Fig. 1 a handle or case 1 which may have any suitable size or shape corresponding in size and shape to the motor cases now commonly employed on electric shaving machines, one end of which is formed with a plug receptacle 2 into which a suitable connector plug 3 may be inserted to supply electric current for the motor housed within the case. At the opposite end of the housing or case 1 is a shaving head indicated generally at 4.

The head 4 includes a stationary blade member 5 mounted upon a frame 6, which in turn is secured to a base block 7, the base block 7 constituting also the bearing mounting for a movable blade 8.

In the form of the device illustrated herein, the stationary blade member 5 includes an elongated arcuate strip or sheet of metal having the necessary characteristics to permit it to hold sharp shearing edges, the shape of the stationary blade member 5 being substantially a sector of a cylinder or tube, the curved outer surface of which is adapted to be drawn over the face of the person using the machine.

The movable blade 8 is illustrated as comprising a relatively thin plate adapted to be oscillated immediately below the stationary blade member 5 in such manner that one edge 9 of the blade, comprising the shearing edge thereof, will be repeatedly swung forwardly and rearwardly of the stationary blade member 5, the path of movement described by the shearing edge of the movable blade being preferably about an arc concentric with the outer surface of the stationary blade member 5.

The stationary blade member 5 is provided with a plurality of longitudinally extending slots 11 to provide upon the blade member 5 a plurality of shearing edges 12 on each side of the slots 11 in such manner that hair or whiskers may enter into the slot 11 and be sheared off as the shearing edge of the movable blade passes the shearing edges 12 formed upon the stationary blade.

As will be understood by those skilled in the art, the blade member 5 may be formed integrally with or separate from the frame or carrier member 6, it being preferable for economy of construction to form the blade member 5 separate from the frame. As is illustrated particularly in Fig. 6, the frame 6 has such shape as will readily permit it to be stamped from suitable sheet metal stock, either steel or any other metal having sufficient rigidity to hold its shape and yet permitting it to be readily stamped out by ordinary processes. The frame 6 comprises essentially a pair of longitudinal rail members 13 at opposite sides of the frame, interconnected at their ends with cross members 14, the upper edges of the rail 13 being stamped and shaped to provide a plurality of small slots 15 while as is illustrated particularly in Figs. 2 and 5, the stationary blade member 5 is formed with a plurality of stiffening ribs 16 extending radially inwardly of the curved shape thereof, the ends of these ribs being receivable in the slots 15 on the frame 6 and secured therein by any suitable means such as soldering or brazing.

By employing this construction it will be apparent that the entire stationary blade and its supporting frame may be constructed of relatively inexpensive materials, the stationary blade member 5 being of course constructed of relatively high grade steel adapted to be hardened sufficiently to hold its sharp shearing edges while the frame or carrier 6 therefor may be constructed of much less expensive material. The machining operations necessary to produce the stationary blade are reduced therefore to a minimum, the carrier being formed by a simple stamping operation, as will be readily understood by those skilled in this art, while the blade member 5 may be readily stamped into its arcuate shape from a piece of material of sufficient thickness to accommodate the stationary blades 17 and the stiffening ribs 16, such thickness being indicated between the arrows X on Fig. 5. Again if desired the piece of material from which the stationary blade member is to be formed may be readily stamped into its arcuate shape or may be cut or machined into its arcuate shape, dependent upon which of these operations appears to be the least expensive. The formation of the slots 11 and the stiffening ribs 16 may be readily accomplished by two simple milling operations, namely, one operation which comprises the cutting away of the underneath portion of the material of the stationary blade member between the ribs 16, an operation which may be readily achieved by the use of simple circular milling tools, while the slots 11 may be formed by running a series of milling cutters longitudinally across the upper surface of the blade member 5 to form the desired number of slots, such milling operation either including the cutting of the slots by a gang of narrow circular milling cutters to form all of the slots in a single operation or the repeated movement of a single thin circular milling cutter longitudinally across the blade member 5 and shifting the position of the cutter or the blade member in the cutting of the adjacent slots.

Figure 5:
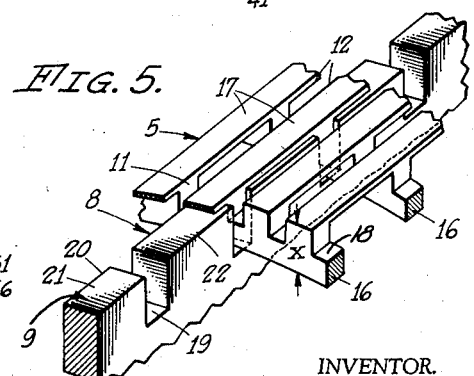
Fig. 5 is a detail enlarged view of a portion of the stationary blade member and a portion of the movable blade member and illustrating the manner in which the shearing action takes place.

Irrespective of the manner of forming the slots and the ribs in the stationary blade member, I prefer that the underneath portion of the material be cut away to leave only a thin shell at the upper or outer surface of the blade member 5 so as to provide extremely thin face-contacting blades 17 and I prefer to cut the slots 11 not only through this thin shell of material but also to some considerable distance downwardly into the ribs 16, as is clearly indicated at 18 in Fig. 5.

The number of slots 11 which may be employed upon a given surface area of the stationary blade member 5 may be varied within extremely wide limits though I prefer to employ a relatively large number of such slots to form a series of 8, 10, 12 or more stationary blades 17 distributed across the surface area of the member 5, the greater the number of slots provided affording greater opportunity for the hair or whiskers to enter into the space between the adjacent shearing edges of the stationary blade. By forming the outer surface of the stationary blade in arcuate shape, the precise angle at which the razor construction must be held against the face is not critical since at substantially any angle two or more of the stationary blades will be presented to the skin surface. Also an important result achieved by the undercut of the slots 12 into the ribs 16 is that relatively long hairs may enter the slots and be projected below the depth of the blades 17 where they may be readily sheared off by the movable blade 8, as will be more fully described hereinafter.

The movable blade member 8 has a number of transverse slots 19 extending inwardly of the plate from the shearing edge 9 thereof, such slots being of such width and so spaced along the edge of the plate as to permit the reception therein of the stiffening ribs 16 on the stationary blade member 5. The depth of such slots is preferably somewhat in excess of the depth of the ribs 16 so that when the movable blade 8 is assembled with the stationary blade member 5, as is indicated particularly in Figs. 2, 3 and 5, the shearing edge of the movable blade may bear upon and slide along the underneath surface of the thin stationary blades 17.

By providing the slots 19 in the movable blade 8, it will be apparent that the movable blade presents a plurality of relatively short shearing edges to the underneath surface of the stationary blade member 5 so that the stationary blades 17 may be made extremely thin between the ribs 16 and yet receive ample support and stiffening from the ribs 16 to prevent these short lengths of the stationary blade from flexing to any material degree either toward or away from the shearing edges of the movable blade irrespective of the pressure with which the stationary blade member may be pressed against the skin surface during shaving operations and irrespective of the toughness or thickness of a hair which may be projected for shearing into the slots 11.

The movable blade is mounted for oscillation about an axis which is concentric with the arcuate outer surface of the stationary blade member 5 and is rigidly held upon its axis in such manner that the entire surface edge 20 (see Fig. 5) is at all times presented to the underneath surface of the stationary blades 17 so that any wearing between the movable and stationary blades will tend to render these blades self-sharpening, that is, the corners 21 and 22 on the shearing edge of the movable blade will always remain sharp.

Figure 2:
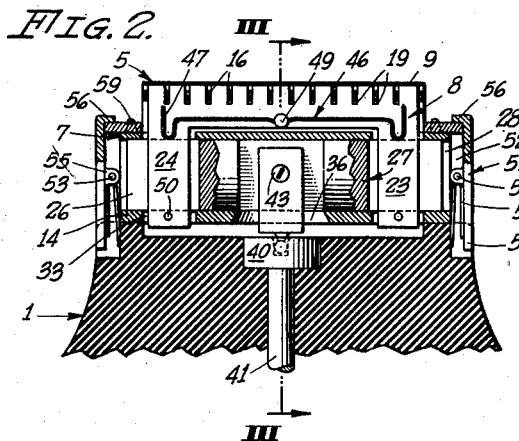
Fig. 2 is a vertical sectional view taken through the head of the machine shown in Fig. 1 and illustrating a portion of the case or handle for housing the motor.
Figure 3:
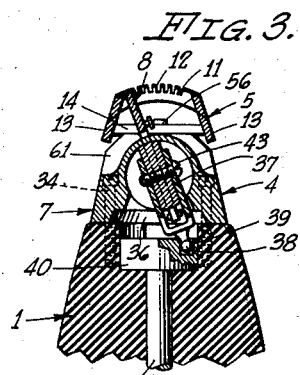
Fig. 3 is a transverse vertical sectional view taken along line III—III of Fig. 2.
Figure 4:
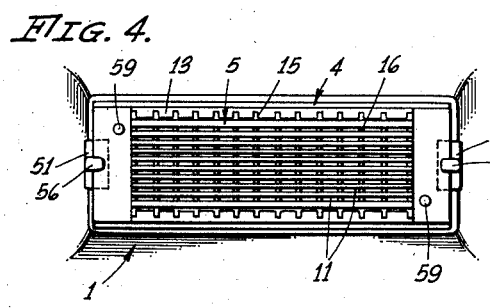
Fig. 4 is a top plan view of the head and a portion of the case shown in Fig. 1.

A simple and inexpensive mounting for the movable blade is illustrated particularly in Figs. 2, 3 and 6 wherein the movable blade 8 is illustrated as having a substantially U-shape, the legs 23 and 24 of the blade extending downwardly from the shearing edge 9 thereof to be received in a pair of slots 25 and 26, respectively, formed in and extending along a plane intersecting the longitudinal axis of a round rod shaft 27. The shaft 27 may be readily constructed by cutting suitable lengths from round stock material and sawing or milling the slots 25 and 26 into the ends of the cut lengths, the width of the slots 25 being preferably just sufficient to slidably receive the legs of the movable blade but permitting relatively no lost motion between the blade and the shaft 27 when the shaft is oscillated.

The base block or bearing block 7 may be cast to the desired shape, as shown in Fig. 6, and drilled longitudinally to form circular bearing openings 28, 29, and 30 therein to receive the shaft 27 or, if desired, the plug 7 may be die cast with bearing inserts forming aligned circular bearings for the shaft 27. The bearing block 7 has recessed or cut out portions indicated at 32 and 33 adjacent each of its ends, through which the legs 23 of the movable blade 9 may project into the slots 25 on the shaft and which will permit oscillation of the shaft 27 and blade 9 without interference with the bearing block 7. The bearing block 7 may be readily mounted upon the handle or case 1 as by a plurality of screws 34 extending through suitable openings 35 on the bearing block and threaded into the upper end of the case as shown in Fig. 3.

To apply power to oscillate the shaft 27 and the movable blade 9, I prefer to provide a recess 36 extending through the bottom of the bearing block 7 into communication with the bearing openings 28–30, into which may project a U-shaped clip 37 having a ball 38 formed upon its lower end for reception into a circular opening 39 in the upper end or head 40 of the motor shaft 41, the circular opening 39 being offset any desired distance from the axis of rotation of the motor shaft 41. The legs of the U-shaped clip 37 extend upwardly about the shaft 27, recesses 42 being formed on opposite sides of the shaft to provide flattened surfaces thereon to engage the clip and the clip and shaft may be secured together by means of a suitable screw 43 extending through openings 44 in the clip and through a transverse opening 45 formed in the shaft at its approximate center.

As illustrated particularly in Figs. 2 and 3, the assembled movable blade and shaft will be readily oscillated about the longitudinal axis of the shaft to repeatedly move the shearing edge of the movable blade past the stationary blades 17. The shearing edge of the blade 9 should be urged gently toward the underneath surface of the stationary blades 17 to insure a clean shearing action therebetween and for this purpose suitable springs or other devices may be employed, either urging the blade per se toward the stationary blade member, as illustrated herein, or the entire shaft and blade assembly may be spring urged toward the movable blade member, as is disclosed in my Patent 2,146,298, issued February 7, 1939.

One convenient manner of urging the movable blade against the stationary blade is illustrated herein as comprising a long thin spring 46, the ends of which are bent as indicated at 47 to provide finger-like projections which will engage and bear upon the shaft 27 while the central portion of the spring 46 is bent to form a depression 48 adapted to receive a pin 49 secured to the movable blade 8 so that the effect of the spring will be to gently urge the movable blade radially from the shaft 27. When the stationary blade member 5 and its frame are in place upon the head, the movable blade is limited in its outward movement by the stationary blade member but when the stationary blade member is removed, as hereinafter described, I provide stop pins 50 on the legs 23 and 24 of the movable blade plate, normally disposed below the shaft 27 and to engage the shaft 27, preventing accidental removal of the plate from its shaft.

To facilitate assembly of the parts and to permit the ready cleaning of the razor mechanism, I removably mount the stationary blade and its frame upon the base block 7 as by providing at each end of the base block 7 finger catches 51 counter-sunk into vertically extended recesses 52 formed in the ends of the base block and pivoted thereto by means of pivots 53 extending through aligned openings 54 in the base block 7 and through a lug 55 formed upon the finger catches 51. The catches 51 are provided with inturned fingers 56 which project over the cross bars 14 on the frame 6 and hold the frame snugly down upon the base block 7 while pressing inwardly the lower ends 57 of the catches 51 the fingers 56 may be moved outwardly a sufficient distance to permit the frame 6 to be readily disassembled from the base block. A suitable bent leaf spring 58 disposed between the case 1 and the catches 51 normally urge the fingers 56 inwardly to prevent accidental release of the frame from the head. Aligning pins 59 formed upon the base block 7 are adapted to enter aligning holes 60 in the frame 6 to insure accuracy of alignment of the frame 6 with the base block 7, a feature which is particularly important since it is desirable that the side rails 13 of the frame should be spaced away from the base block 7 to provide openings 61 extending substantially the length of the head on opposite sides thereof to permit cut hair to fall out of the space between the movable blade member and the base block and thus render the mechanism substantially self-cleaning.

It will be observed therefore that the entire construction of the razor mechanism as heretofore described may be made from simple stampings and the only machining which is necessary is the milling of the stationary blade member to form the ribs and to form the slots therein, and the sawing of slots 25 and 26 and the milling or flattening of the shaft to form the recesses 42 therein, rendering the entire construction extremely economical to manufacture.

If desired, a multiple movable blade may be provided in place of the single plate blade 8, such multiple blade being illustrated particularly in Fig. 7 wherein the movable blade member may be stamped from a suitable piece of steel to provide two slotted or tooth-like blade elements 8a and 8b, interconnected at their ends by a portion of the metal as indicated at 62, and braced relative to each other by end braces 62. The blade assembly may be readily mounted upon the same shaft structure and same bearing block structure as hereinbefore described by providing a yoke 64 having a substantial U-shape, the legs 65 of which may project downwardly into the slots 25 and 26 of the shaft and the base of the U-shape being provided at either of its ends with ears 66 projectable into the space between the braces 63 where they may be pivoted to the braces by any suitable pivot means extending through openings 67 in the ears and openings 68 in the braces. With this form of blade each oscillation of the blade mechanism will pass two spaced blades past the slots 11 in the stationary blade member.

In Fig. 8 I have illustrated a modified form of blade member wherein greater openings are provided for the reception of hairs into the slots between adjacent blades 17 and in which the hairs may be substantially "combed" into contact with the shearing edges of the blades. In this form of the device the slots 11 are formed in the same manner as was described for the formation of the slots in the stationary blade member described in Figs. 1 through 6 and then shearing edges 12a of the blades 17 may be filed, cut or otherwise machined to provide a serrated edge surface constituting the shearing edge. It may be desirable to merely serrate one edge of each of the blades 17 as indicated in Fig. 8 while all of the blades 17 on one side of the central slot 11 may have their serrated edges extending in one direction while the blades on the opposite sides of the central slot may have their serrated edges extending in the opposite direction, as shown in Fig. 8.

While I have shown and described the preferred embodiment of my invention, I do not desire to be limited to any of the details of construction shown or described herein, except as defined in the appended claims.

I claim:

1. In a machine of the character described, a stationary blade structure including a thin body portion, the outer surface of which is adapted to be pressed against the skin and having a plurality of hair-receiving openings therein defining a plurality of stationary shear blades, a movable blade having a shearing edge abutting the under surface of the body portion, means mounting said blade for movement in a fixed path past all of said stationary shear blades, a plurality of slots formed in the movable blade member and extending from the shearing edge thereof and in the direction of movement of the movable blade past the stationary blades, and a plurality of webs formed upon and extending inwardly from said body portion for reception into the slots formed in said movable blade member, said webs extending across said hair receiving openings to divide the shear blades defined thereby into short sections, permitting the stationary blades to be made extremely thin but rigid.

2. In a machine of the character described, a stationary blade structure including an elongated thin body portion, the outer surface of which is adapted to be pressed against the skin, a plurality of slots through the body portion and extending generally longitudinally along said body portion to divide said body portion into a plurality of stationary shear blades each having shearing edges on opposite edges thereof, a movable blade having a shearing edge abutting the under surface of the body portion, means mounting said blade for movement in a fixed path past all of said stationary shear blades, a plurality of slots formed in the movable blade member and extending from the shearing edge thereof in the direction of movement of the movable blade past the stationary blades, and a plurality of webs formed upon and extending inwardly from said body portion for reception into the slots formed in said movable blade member, said webs extending across the slots of said stationary blade structure to divide the stationary shear blades into a plurality of short sections, permitting the stationary blades to be made extremely thin but rigid.

3. In a machine of the character described, a stationary blade structure including an elongated thin body portion, the outer surface of which is adapted to be pressed against the skin, a plurality of slots in said body portion extending generally longitudinally along said body portion to divide said body portion into a plurality of stationary shear blades disposed substantially parallel to each other and spaced from each other laterally across the body portion, each having shearing edges on opposite edges thereof and having a plurality of reinforcing webs extending inwardly from and laterally across the under surface of said thin body portion and crossing said stationary blades and slots, said webs being spaced along the length of said body to divide said stationary blades into a plurality of short sections, a movable blade extending longitudinally of said stationary blade structure and having a shearing edge thereon abutting the under surface of the body portion, means mounting said movable blade member for movement in a fixed path in a direction transverse to and past the shearing edges of said stationary blades, and a plurality of transverse slots formed in said movable blade member and extending from the shearing edges thereof to constitute recesses receiving the webs of said stationary blade member and permitting the shearing edge of the movable blade to approach closely to the skin-contacting surface of the stationary blade member.

4. In a machine of the character described, a stationary blade structure including an elongated thin body portion, the outer surface of which is adapted to be pressed against the skin and having a plurality of longitudinal slots therethrough, each of said slots extending continuously substantially from end to end of said body portion to provide hair-receiving openings therein, said slots being disposed in spaced parallel relation to each other laterally of said body portion to divide said body portion into a plurality of laterally spaced stationary blades having shearing edges, a movable blade having a shearing edge abutting the under surface of the body portion, means mounting said blade for movement in a fixed path past all of said stationary shear blades, a plurality of slots formed in the movable blade member and extending from the shearing edge thereof in the direction of movement of the movable blade past the stationary blades, and a plurality of webs formed upon and extending inwardly from said body portion for reception into the slots formed in said movable blade member whereby said webs divide said stationary blades longitudinally into a plurality of short sections, permitting the stationary blades to be made extremely thin but rigid.

5. In a machine of the character described, a stationary blade structure including an elongated thin body portion, the outer surface of which is adapted to be pressed against the skin, a plurality of slots extending longitudinally through said body portion and spaced laterally from each other to divide said body portion into a plurality of laterally spaced stationary shear blades each having shearing edges on opposite edges thereof, a movable blade having a shearing edge abutting the under surface of the body portion, means mounting said blade for movement in a fixed path past all of said stationary shear blades, a plurality of slots formed in the movable blade member and extending from the shearing edge thereof in the direction of movement of the movable blade past the stationary blades, and a plurality of webs formed upon and extending inwardly from said body portion for reception into the slots formed in said movable blade member whereby said webs divide said stationary blade into a plurality of short sections, permitting the stationary blades to be made extremely thin but rigid, the slots in said stationary blade structure extending into and partially through said webs to provide space above each of said webs to receive hairs below the under surface of said body portion.

6. In a machine of the character described, a stationary blade structure including an elongated thin body portion, the outer surface of which is adapted to be pressed against the skin, a plurality of slots through said body portion, said slots being disposed in laterally spaced relation to each other and each of said slots extending continuously substantially from end to end of said body portion to divide said body portion into a plurality of laterally spaced elongated stationary shear blades each having shearing edges on opposite edges thereof, having a plurality of laterally disposed webs extending across the under surface of said body portion and across said slots, said webs being spaced along the length of said body and extending inwardly thereof to rigidly interconnect all of the stationary blades, a frame for supporting said stationary blade structure, a movable blade having a shearing edge adapted to abut the under surface of the body portion, a base block, means mounting said movable blade upon said base block for movement in a fixed path past all of said stationary shear blades, a plurality of slots formed in said movable blade member and extending from the shearing edges thereof in the direction of movement of the movable blade past the stationary blades, and means detachably mounting said frame upon said base block to nest said webs into the slots formed in said movable blade member.

7. In a machine of the character described, a stationary blade structure including a thin body portion, the outer surface of which is adapted to be pressed against the skin and having a plurality of hair-receiving openings therein defining a plurality of stationary shear blades, and having a plurality of laterally disposed webs formed upon and spaced along the length of said body and extending inwardly thereof to rigidly interconnect all of the stationary blades, a supporting frame for said stationary blade member including side rails having a plurality of slots therein into which the ends of said webs may be received and in which said webs may be secured, a movable blade having a shearing edge abutting the under surface of the body portion, means mounting said blade for movement in a fixed path past all of said stationary shear blades, a plurality of slots formed in the movable blade member and extending from the shearing edge thereof in the direction of movement of the movable blade past the stationary blades, said webs being received into the slots formed in said movable blade member whereby said webs divide said stationary blade into a plurality of short sections permitting the stationary blades to be made extremely thin but rigid.

8. In a stationary blade structure for shaving machines, a plate-like blade member having formed therethrough a plurality of parallel slots extending in a direction transverse to the direction of movement of the plate member over the skin surface to be shaved to provide upon said plate member a plurality of blades, certain of which are disposed on one side of the center line extending parallel to said slots and others disposed on the opposite side of said center line, that edge of each of said blades facing in a direction away from said center line being serrated to present a combing surface to the hairs as said blade is drawn in that direction across the skin surface.

9. A movable blade member for shaving machines including a pair of plate-like blade members, each of which has one of its edges sharpened to define a shearing edge, means interconnecting opposite ends of said blades together to constitute a unit in which the blade edges extend in parallel relation to a common pivot axis, means mounting said movable blade unit for movement in a fixed path in a direction transverse to the shearing edges thereof including a U-shaped yoke, means pivoting the movable blade unit on said yoke near the base of said U-shape, an oscillatable shaft having longitudinally extending slots therein for receiving the legs of said yoke.

10. In a machine of the character described, a shaving head comprising an elongated base member for mounting a movable blade structure, a stationary blade unit including an elongated member adapted to rest upon said base, interengaging cooperating means on said base and said blade unit for accurately aligning said unit on said base relative to said movable blade, and finger members movably mounted on said base at the ends thereof to removably engage the ends of said stationary blade unit to hold the unit in place upon said base.

11. In a machine of the character described, a shaving head comprising an elongated base member for mounting a movable blade structure, a stationary blade unit including an elongated member adapted to rest upon said base, interengaging cooperating means on said base and said blade unit for accurately aligning said unit on said base relative to said movable blade, and means for detachably holding said unit upon said base comprising a pair of finger catches one movably mounted upon each of the end walls of said base and each having a projection thereon extending inwardly over the ends of the stationary blade unit to hold said unit in place upon said base.

12. A shaving head including an elongated base member for mounting a movable blade structure, a stationary blade member including an elongated skin-contacting plate and a supporting frame therefor adapted to rest upon said base, interengaging cooperating members on said base and said frame for accurately aligning said unit on said base relative to the movable blade, and means for removably holding said frame upon said base including a pair of finger catches one pivotally mounted upon each of the end walls of said base and each having a projection thereon extending inwardly over the ends of the stationary blade frame to hold said frame in place upon said base.

13. In a stationary blade structure for a shaving machine, a stationary blade element comprising an elongated arcuate plate-like member having a plurality of elongated slots formed therein to divide said plate into a plurality of elongated shearing blades and having a plurality of webs disposed upon the inner surface of said plate and extending radially with respect thereto, said webs being spaced from each other along the length of said member and intersecting said blades to divide said blades into a plurality of short sections.

14. In a stationary blade structure for a shaving machine, a stationary blade element comprising an elongated arcuate plate-like member having a plurality of elongated slots formed therein to divide said plate into a plurality of elongated shearing blades and having a plurality of webs disposed upon the inner surface of said plate and extending radially with respect thereto, said webs being spaced from each other along the length of said member and intersecting said blades to divide said blades into a plurality of short sections, a supporting frame for said member including longitudinally extending rails secured to the ends of said webs, and end members thereon interconnecting opposite ends of said rails.

15. In a machine of the character described, a thin stationary blade structure, the outer surface of which is adapted to be pressed against the skin including a plurality of stationary shear blades spaced from each other to define a plurality of elongated hair receiving openings, a plurality of laterally disposed webs spaced from each other lengthwise of said stationary shear blades and extending inwardly thereof for supporting all of said stationary shear blades and for lending rigidity thereto, means interengaging and supporting the adjacently disposed ends of said webs, a movable blade having a shearing edge abutting the under surface of said stationary shear blades, means mounting said blade for movement in a fixed path past all of said stationary shear blades, a plurality of slots formed in said movable blade member and extending from the shearing edge thereof in the direction of movement of said movable blade past said stationary blades, said webs being received in said slots, whereby said webs divide said stationary blade into a plurality of short sections, permitting said stationary blades to be made extremely thin but rigid.

16. In a machine of the character described, a thin stationary blade structure, the outer surface of which is adapted to be pressed against the skin, including a plurality of stationary shear blades spaced from each other to define a plurality of elongated hair receiving openings, a movable blade having a shearing edge abutting the under surface of said stationary blade structure, means mounting said movable blade for movement in a fixed path past all of said stationary shear blades, a plurality of slots formed in said movable blade member and extending from the shearing edge thereof and in the direction of movement of said movable blade past said stationary blades, and a plurality of webs engaging the under surface of said stationary blade structure for supporting said stationary blades, said webs extending inwardly of said stationary blades for reception into said slots and extending across said hair receiving openings to divide said stationary shear blades into short sections, permitting said stationary blades to be made extremely thin but rigid.

17. In a stationary blade structure for a shaving machine, a plurality of stationary blade elements defining elongated shearing blades, means mounting said blade elements in spaced parallel relation to each other to define a plurality of elongated hair receiving slots between said shearing blades, and a plurality of supporting webs disposed in spaced parallel relation to each other engaging the under surface of said blade elements for supporting the same and lending rigidity thereto, said webs being disposed transversely of the length of said blade elements and extending across said slots to divide said shearing blades into a plurality of short sections.

ARTHUR F. JENSEN.